United States Patent
Ortiz Egea et al.

(10) Patent No.: US 10,477,173 B1
(45) Date of Patent: Nov. 12, 2019

(54) CAMERA WITH TUNABLE FILTER AND ACTIVE ILLUMINATION

(71) Applicant: Microsoft Technology Licensing, LLC, Redmond, WA (US)

(72) Inventors: Sergio Ortiz Egea, San Jose, CA (US); Onur Can Akkaya, Palo Alto, CA (US); Cyrus Soli Bamji, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/987,852

(22) Filed: May 23, 2018

(51) Int. Cl.
*H04N 5/232* (2006.01)
*G02F 1/137* (2006.01)
(Continued)

(52) U.S. Cl.
CPC ........... H04N 9/68 (2013.01); G02F 1/13718 (2013.01); G02F 1/133528 (2013.01);
(Continued)

(58) Field of Classification Search
CPC ...... H04N 9/68; H04N 5/2251; H04N 5/2256; H04N 5/23222; H04N 5/33; G06T 7/521; G02F 1/133528; G02F 1/13718
See application file for complete search history.

(56) References Cited

U.S. PATENT DOCUMENTS 6,456,793 B1 9/2002 Ray et al.
6,633,354 B2 10/2003 Li et al.
(Continued)

FOREIGN PATENT DOCUMENTS

EP 1058147 A2 12/2000
WO 9510065 A1 4/1995
(Continued)

OTHER PUBLICATIONS

"Multispectral Optical Filter Assemblies", Retrieved From https://web.archive.org/web/20130912193244/https:/www.photonicsonline.com/doc/multispectral-optical-filter-assemblies-0001, Sep. 12, 2013, 1 Page.
(Continued)

*Primary Examiner* — Tsion B Owens
(74) *Attorney, Agent, or Firm* — Alleman Hall Creasman & Tuttle LLP

(57) ABSTRACT

A camera includes an optical filter for a sensor array of the camera. The optical filter includes a plurality of liquid crystal layers switchable between a reflection state and a transmission state. Each liquid crystal layer is configured to block spectral light in a different spectral light sub-band and transmit spectral light outside of the spectral light sub-band in the reflection state, and to transmit spectral light in the spectral light sub-band in the transmission state. An active illuminator of the camera is configured to emit active light in a selected spectral light sub-band. One or more of the plurality of liquid crystal layers is switched from the transmission state to the reflection state to tune the optical filter to block spectral light in all but the selected spectral light sub-band. The sensors of the sensor array are addressed to measure spectral light in the selected spectral light sub-band.

20 Claims, 8 Drawing Sheets

(51) Int. Cl.
*H04N 9/68* (2006.01)
*H04N 5/225* (2006.01)
*H04N 5/33* (2006.01)
*G06T 7/521* (2017.01)
*G02F 1/1335* (2006.01)

(52) U.S. Cl.
CPC ............ *G06T 7/521* (2017.01); *H04N 5/2251* (2013.01); *H04N 5/2256* (2013.01); *H04N 5/23222* (2013.01); *H04N 5/33* (2013.01); *G02F 2001/133541* (2013.01); *G02F 2203/11* (2013.01)

(56) References Cited

U.S. PATENT DOCUMENTS

| | | | |
|---|---|---|---|
| 7,187,452 B2 | 3/2007 | Jupp et al. | |
| 7,310,125 B2 | 12/2007 | Kim et al. | |
| 7,342,658 B2 | 3/2008 | Kowarz et al. | |
| 7,375,803 B1 | 5/2008 | Bamji | |
| 7,420,656 B1 | 9/2008 | Sandusky et al. | |
| 7,446,299 B2* | 11/2008 | Kobayashi | G01J 3/10 250/216 |
| 7,652,736 B2 | 1/2010 | Padiyath et al. | |
| 7,835,002 B2 | 11/2010 | Muhammed et al. | |
| 8,109,634 B2* | 2/2012 | Gil | A61B 5/14555 351/206 |
| 8,780,113 B1 | 7/2014 | Ciurea et al. | |
| 9,060,110 B2 | 6/2015 | Imai | |
| 9,316,865 B2 | 4/2016 | Osterman et al. | |
| 9,551,616 B2* | 1/2017 | McQuilkin | G01J 3/2803 |
| 9,595,239 B2 | 3/2017 | Drolet et al. | |
| 9,823,128 B2* | 11/2017 | Pau | G01J 3/513 |
| 10,180,385 B2* | 1/2019 | Fox | G01N 15/1012 |
| 2004/0135955 A1 | 7/2004 | Hong | |
| 2010/0140461 A1 | 6/2010 | Sprigle et al. | |
| 2012/0019834 A1* | 1/2012 | Bornhop | G01N 21/45 356/517 |
| 2012/0287247 A1 | 11/2012 | Stenger et al. | |
| 2014/0152944 A1 | 6/2014 | Zhao | |
| 2014/0378843 A1 | 12/2014 | Valdes et al. | |
| 2015/0304637 A1 | 10/2015 | Shin | |
| 2016/0033806 A1 | 2/2016 | Lavrentovich et al. | |
| 2016/0103015 A1 | 4/2016 | Ichihashi | |
| 2017/0140221 A1 | 5/2017 | Ollila et al. | |
| 2017/0230551 A1 | 8/2017 | Akkaya et al. | |
| 2017/0248811 A1 | 8/2017 | Clemen, Jr. et al. | |

FOREIGN PATENT DOCUMENTS

| | | |
|---|---|---|
| WO | 2012057558 A2 | 5/2012 |
| WO | 2017149370 A1 | 9/2017 |

OTHER PUBLICATIONS

Akkaya, Onur C.., "Camera with Optical Shutter over Sensor Array, Provisional Application as Filed in U.S. Appl. No. 62/649,990", filed Mar. 29, 2018, 18 Pages.

Kim, et al., "A 1.5Mpixel RGBZ CMOS Image Sensor for Simultaneous Color and Range Image Capture", In Proceedings of IEEE International Solid-State Circuits Conference Digest of Technical Papers, Feb. 19, 2012, pp 391-393.

Lee, et al., "Electrically switchable visible to infra-red dual frequency cholesteric liquid crystal light shutter", In Journal of Materials Chemistry C, Mar. 19, 2018, 9 Pages.

Mathies, Daven, "Panasonic's new organic sensor can switch between visible and NIR sensitivity", Retrieved from: https://www.digitaltrends.com/photography/panasonic-organic-visible-nir-sensor/, Feb. 10, 2017, 6 Pages.

Xiang, et al., "Electrically Tunable Selective Reflection of Light from Ultraviolet to Visible and Infrared by Heliconical Cholesterics", In Journal of Advanced Materials, vol. 27, Issue 19, Mar. 27, 2015, pp. 3014-3018.

Hansard, et al., "Time-of-Flight Cameras: Principles, Methods and Applications", Published in Springer Briefs in Computer Science, Dec. 7, 2012, 103 Pages.

Cang, Chein-I, "Hyperspectral Imaging: Techniques for Spectral Detection and Classification", in Publication of Springer Science & Business Media, vol. 1, Jul. 31, 2003, 372 Pages.

"International Search Report and Written Opinion Issued in PCT Patent Application No. PCT/US2019/030985", dated: Jul. 30, 2019, 12 Pages.

"International Search Report and Written Opinion Issued in PCT Application No. PCT/US2019/023495", dated: Jun. 17, 2019, 11 Pages.

Zanuttigh, et al., "Time-of-Flight and Structured Light Depth Cameras: Technology and Applications", in Publication of Springer, Jan., 2016, 360 Pages.

Hans, et al., "Techniques and Applications of Hyperspectral Image Analysis", in Publication of John Wiley & Sons, Sep. 27, 2007, 9 Pages.

\* cited by examiner

CAMERA WITH TUNABLE FILTER AND ACTIVE ILLUMINATION

BACKGROUND

A camera may include an optical filter to limit a portion of the electromagnetic spectrum that reaches image sensors of the camera. For example, an infrared (IR) camera may include an optical filter that is configured to transmit light in the IR or near-infrared (NIR) band and block light in the portion of the electromagnetic spectrum that is outside of the IR or NIR band from reaching the image sensors of the IR camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera includes an optical filter for a sensor array of the camera. The optical filter includes a plurality of liquid crystal layers switchable between a reflection state and a transmission state. Each liquid crystal layer is configured to block spectral light in a different spectral light sub-band and transmit spectral light outside of the spectral light sub-band in the reflection state. On the other hand, each liquid crystal layer is configured to transmit spectral light in the spectral light sub-band in the transmission state. An active illuminator of the camera is configured to emit active light in a selected spectral light sub-band. One or more of the plurality of liquid crystal layers is switched from the transmission state to the reflection state to tune the optical filter to block spectral light in all but a selected spectral light sub-band. The sensors of the sensor array are addressed to measure spectral light in the selected spectral light sub-band.

DETAILED DESCRIPTION

Attempts to acquire different types of images (e.g., visible, depth, multi-spectral) using the same sensor array may be complicated by the different wavelength sub-bands used by the respective imaging processes. Visible imaging typically uses wide-band visible light as the illumination source; depth imaging typically uses narrowband infrared (IR) light; and multi-spectral imaging uses spectral light in different narrow spectral light sub-bands. In one approach, a specialized array of filter elements is arranged in registry with the sensor elements of the sensor array. The filter array includes a repeated side-by-side tiling of filter elements having visible-transmissive, IR-blocking elements as well as IR-transmissive, visible-blocking elements. A disadvantage of this approach is that both visible and IR images are acquired on less than the full area of the sensor array, which decreases both the resolution and the signal-to-noise ratio for both images.

Accordingly, this disclosure is directed to a tunable optical filter configured to adjust which selected spectral light sub-band is allowed to pass to the sensor array in order to selectively image spectral light in different spectral light sub-bands. The optical filter may be advantageously incorporated into a camera to facilitate acquisition of images in different spectral light and IR sub-bands with high signal-to-noise ratio. Moreover, the optical filter may enable the camera to acquire images in different spectral light sub-bands using passive or active illumination.

Figure 1A:
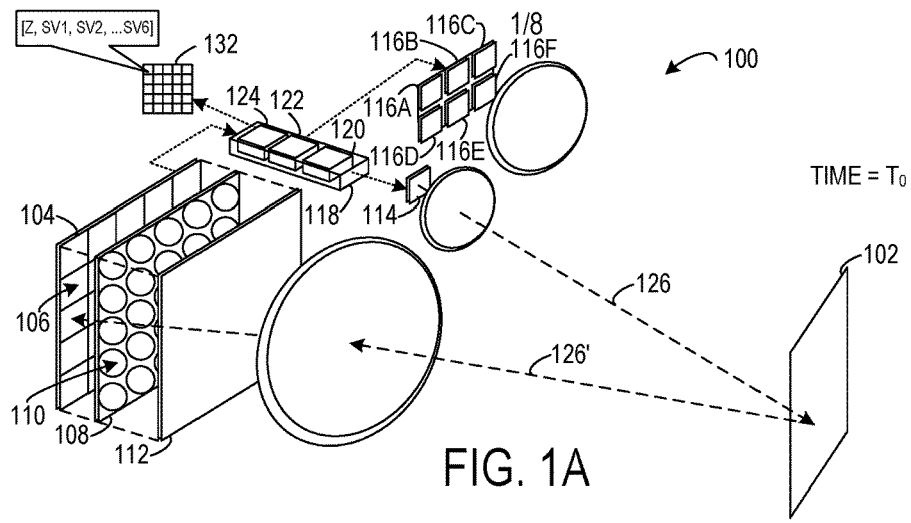
FIGS. 1A-1C are exploded, schematic views showing aspects of an example camera.
Figure 1B:
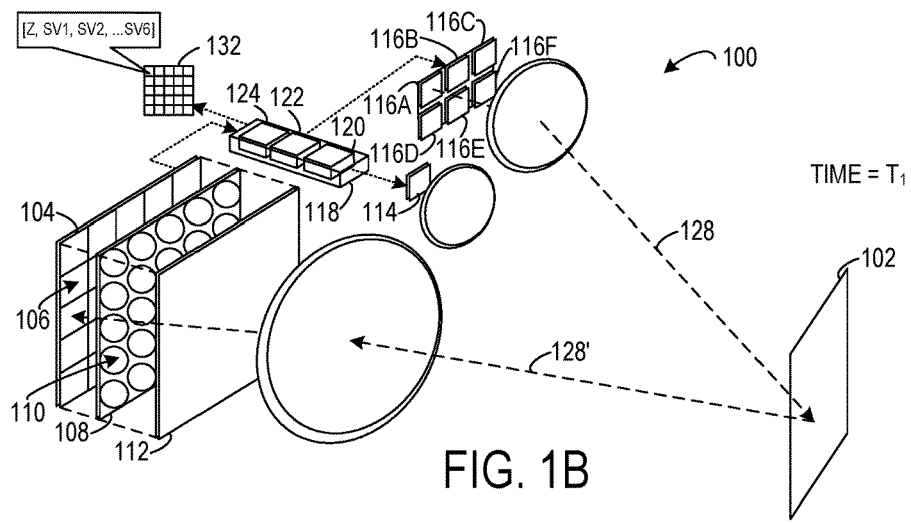
Figure 1C:
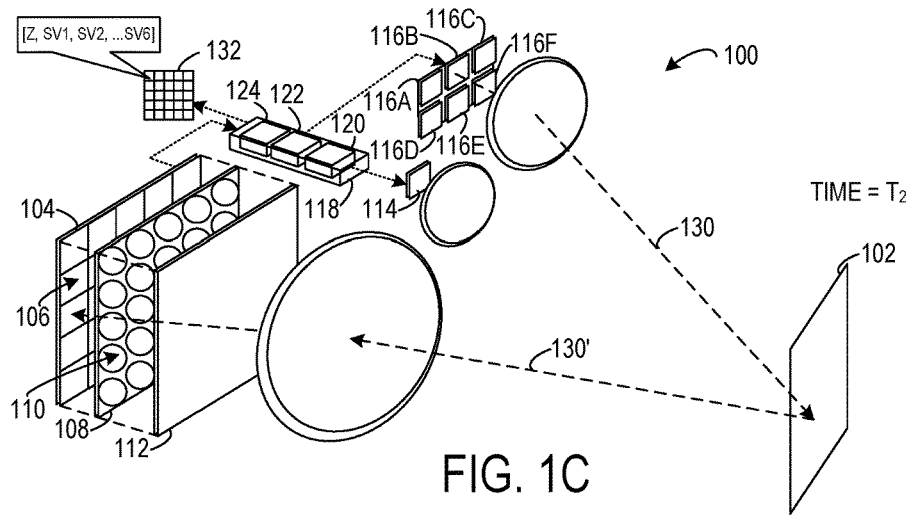

FIGS. 1A-1C shows aspects of an example camera 100. The term 'camera' refers herein to any imaging component having at least one optical aperture and sensor array configured to image a scene or subject 102. Camera 100 includes a sensor array 104 of individually addressable sensors 106. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 104 is schematically illustrated with only twenty-five sensors 106 for simplicity, although there is no theoretical limitation to the number of sensors 106.

In some implementations, the sensors 106 of sensor array 104 may be differential sensors. Each differential sensor may include different regions that are energized according to two different clock signals. In one example, to measure modulated active illumination, the two clock signals may be substantially complementary (e.g., the two clock signals have 50% duty cycles that are 180 degrees out of phase). In other examples, the two clock signals may have a different relationship, such as for measuring ambient illumination or non-modulated active illumination. When the different regions are activated based on the corresponding clock signal, electric fields are created that attract and collect photoelectric charges in the different regions. The different regions may be separated by a p-type doped area that creates a barrier that ensures charges collected in one region do not transfer to an adjacent region even if one is at a higher potential.

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

Microlens array 108 optionally may be arranged directly over sensor array 104. Microlens array 108 includes a plurality of microlens elements 110. Each microlens element 110 of microlens array 108 may be registered to a differential sensor 106 of the sensor array 104. When included, microlens array 108 may provide a larger effective fill factor at each of the sensors, for increased collection efficiency and reduced cross-talk between pixels.

Optical filter 112 may be arranged over sensor array 104, so as to optically cover the sensor array. Optical filter 112 includes a plurality of liquid crystal layers individually switchable between a reflection state and a transmission state. Each liquid crystal layer is configured to block spectral light in a different spectral light sub-band and transmit other spectral light outside of the spectral light sub-band when that layer is in the reflection state. For example, yellow spectral light can be selectively blocked while orange and green spectral light is allowed to pass. Each layer of the filter may be configured to transmit a desired range of other spectral or non-spectral color bands when that layer is in the reflection state. In some examples, each layer of the filter may be configured to transmit IR light when that layer is in the reflection state. In other examples, each layer of the filter may be configured to block IR light when that layer is in the reflection state. Blocked spectral light may be absorbed, reflected, and/or scattered by the optical filter 112, depending on the implementation. Further, each liquid crystal layer is configured to transmit spectral light in the spectral light sub-band along with spectral light outside the spectral light sub-band when that layer is in the transmission state. For example, yellow, orange, and green spectral light is allowed to pass. Each layer of the filter may be configured to transmit a desired range of other spectral and/or non-spectral color bands when that layer is in the transmission state. In some examples, each layer of the filter may be configured to transmit IR light when that layer is in the transmission state. In other examples, each layer of the filter may be configured to block IR light when that layer is in the transmission state. In one example, optical filter 112 utilizes the cholesteric phase of liquid crystals (LC) to create different Bragg reflections that can be electrically switched on and off. Optical filter 112 may be configured to be tuned to block spectral light in all but a selected spectral light sub-band. In particular, one or more liquid crystal layers of the optical filter 112 may be switched from the transmission state to the reflection state to adjust the center wavelength and/or the bandwidth of the selected spectral light sub-band. Note that the Bragg reflections created by the different liquid crystal layers, in some cases, may have some out-of-band spectral light leakage (e.g., 5%), such that not all out-of-band spectral light is blocked when the liquid crystal layer is in the reflection state. In other words, the optical filter 112 may be tuned to block at least some spectral light in all but a selected spectral light sub-band.

Optical filter 112 may include any suitable number of liquid crystal layers configured to block different spectral light sub-bands in the reflection state. Moreover, different liquid crystal layers may be configured to block different sized spectral light sub-bands. In some examples, a liquid crystal layer may be configured to block a narrow spectral light sub-band. In some examples, a liquid crystal layer may be configured to block a wide spectral light sub-band. The number of liquid crystal layers and the bandwidth of the spectral light sub-bands blockable by each liquid crystal layer may dictate the granularity of adjustment of the selected spectral light sub-band to which the optical filter 112 can be tuned. For example, a greater number of liquid crystal layers of the optical filter 112 may enable finer adjustment of the selected spectral light sub-band. Optical filter 112 may include any suitable number of liquid crystal layers. Each liquid crystal layer may be configured to block any suitable spectral light sub-band in the reflection state.

In some implementations, the optical filter 112 may be configured to be tuned according to different illumination sources of the camera 100 and/or types of images acquired by the camera 100. In some implementations, the optical filter 112 may be configured to transmit infrared (IR) light in an IR light sub-band in both the transmission state and the reflection state, and block visible light when all of the plurality of liquid crystal layers are in the reflection state. Such a configuration may allow for acquisition of high signal-to-noise ratio IR images. In other implementations, the optical filter 112 may be configured to block IR light in the reflection state.

In some implementations, the optical filter 112 may be configured to be tunable for each of a plurality of different spectral light sub-bands. In some such implementations, the plurality of different spectral light sub-bands may correspond to a plurality of different spectral illuminators configured to emit active spectral light. Example spectral light sub-bands that correspond to different spectral illuminators may include deep blue (460 nm), blue (470 nm), true green (528 nm), yellow (587 nm), amber (617 nm), red (625 nm), hyper-red (645 nm), far-red (730 nm), and near IR (810 nm). In some implementations, the optical filter 112 may be configured to be tunable to spectral light sub-bands of some but not all spectral illuminators of a camera. In other implementations, the optical filter may be used with broadband active spectral illumination (e.g., modulated or non-modulated white light). In yet other implementations, the optical filter 112 may be used with passive illumination (e.g., ambient). Such a configuration of the optical filter 112 may allow for acquisition of high-signal-to-noise ratio hyperspectral/multispectral images in each of these different illumination scenarios.

An IR illuminator 114 is configured to emit active IR light to illuminate the subject 102. In one example, the IR illuminator 114 includes an IR laser configured to emit IR light. In some implementations, the IR illuminator 114 optionally may include a diffuser covering a field of illumination of the IR illuminator 114.

In some implementations, one or more spectral illuminators 116 optionally may be included to provide active spectral illumination. When included, a plurality of spectral illuminators 116 (e.g., 116A, 116B, 116C, 116D, 116E, 116F) may be configured to emit active spectral light to illuminate the subject 102 in a plurality of different spectral light sub-bands. Each of the spectral illuminators may be individually controllable—e.g., a single spectral illuminator may be activated while the other spectral illuminators remain deactivated. The plurality of spectral illuminators 116 may take any suitable form. In one example, the spectral illuminators 116 include light emitting diodes configured to emit spectral light. There is not a theoretical limit on the number of spectral illuminators that may be used, nor on the spectral-light sub-bands that each spectral illuminator may be configured to emit.

In one example implementation, a camera may include, in addition to the IR source, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. While not required, the camera 100 typically includes more than three spectral illuminators. In some implementations, the spectral illuminators may emit light in other sub-bands, such as hyper-red, near IR, or IR.

In other implementations, a camera may include a broad-band illumination source, such as a white light source. The broad-band illumination source may be employed instead of the plurality of spectral illuminators. In some implementations, the broad-band illumination source may be modulated. In other implementations, the broad-band illumination source may be non-modulated.

Electronic controller 118 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 118 includes a depth controller machine 120, a spectral controller machine 122, and an output machine 124. Machines 120, 122, 124 may be implemented as separate physical hardware and/or firmware components or incorporated into a single hardware and/or firmware component.

The depth controller machine 120 is configured to tune the optical filter 112 to selectively block most to all visible light. For example, the depth controller machine 120 may switch all liquid crystal layers of the optical filter 112 to the reflection state such that only light outside the blocked spectral bands (e.g., IR light) is transmitted through the optical filter 112. The depth controller machine 120 is configured to activate the IR illuminator 114 and synchronously address the sensors 106 of sensor array 104 to acquire IR images. In the example shown in FIG. 1A, at time $T_0$, the depth controller machine 120 tunes the optical filter 112, activates the IR illuminator 114 to illuminate the subject 102 with active IR light 126, and addresses the sensors 106 of sensor array 104 in synchronicity. IR light 126' reflects from the subject 102 back to the camera 100, is transmitted through the optical filter 112, and is incident on the sensors 106 of the sensor array 104 for IR image acquisition. Note that the depth controller machine 120 may measure any suitable aspect of the active IR light including, but not limited to, an intensity and a phase offset. Further, note that the depth controller machine 120 may acquire a plurality of IR images in the process of acquiring a depth map.

FIG. 1B shows camera 100 measuring a spectral light sub-band emitted by a first spectral illuminator 116A at time $T_1$. The spectral controller machine 122 is configured to sequentially activate the plurality of spectral illuminators 116, one at a time, tune the optical filter 112 to block at least some spectral light in all but the spectral light sub-band of the selected spectral illuminator, and synchronously address the sensors 106 of sensor array 104. In some implementations, the spectral controller machine 122 may be configured to, for each spectral image acquisition, modulate the frequency of the spectral illuminators 116 in the 100 kilohertz (Khz) to low megahertz (MHz) domain in order to differentially measure the active spectral light and ambient light. Such operation may allow for acquisition of an accurate spectral signature of the subject being imaged.

In the example shown in FIG. 1B, at time $T_1$, the spectral controller machine 122 activates a first spectral illuminator 116A to illuminate the subject 102 in spectral light 128 in a sub-band (e.g., blue) of the spectral illuminator 116A, synchronously tunes the optical filter 112 to block spectral light in all but the spectral light sub-band of the first spectral illuminator 116A, and addresses the sensors 106 of sensor array 104. Spectral light 128' reflects from the subject 102 back to the camera 100, is transmitted through the optical filter 112, and is incident on the exact same sensors 106 used to measure the depth to object 102. In FIG. 1B, the same sensors are used for spectral light image acquisition in the spectral light sub-band (e.g., blue) of the spectral illuminator 116A.

Further, as shown in FIG. 1C, at time $T_2$, the spectral controller machine 122 activates a second spectral illuminator 116B to illuminate the subject 102 with spectral light 130 in a sub-band (e.g., green) of the spectral illuminator 116B, synchronously tunes the optical filter 112 to block spectral light in all but the spectral light sub-band of the second spectral illuminator 116B, and addresses the exact same sensors 106 of sensor array 104. Spectral light 130' reflects from the subject 102 back to the camera 100, is transmitted through the optical filter 112, and is incident on the differential sensors 106 of the sensor array for spectral light image acquisition in the sub-band (e.g., green) of the spectral illuminator 116B. The spectral controller machine 122 may sequentially activate the plurality of spectral illuminators 116 one at a time in synchronicity with switching of the optical filter 112, and addressing of the sensor array 104 to acquire spectral light images in each of the plurality of sub-bands of the spectral illuminators 116.

The term 'address' as applied to sensors 106 of sensor array 104 may have a somewhat different meaning depending on the imaging mode described. For flat-imaging—for spectral light including both visible and IR light—addressing the sensors 106 may include integrating the intensity of active light in the sub-band emitted from the designated spectral (or IR) illuminator and received at each sensor 106 and associating the integrated intensity of the active light in the sub-band with the portion of the image corresponding to that sensor.

For depth imaging, the sensors 106 may be addressed differently. Here, addressing the sensors may include resolving a phase offset from each sensor relative to the modulated intensity of the IR light. The phase offset, optionally converted into the depth domain, may be associated with the portion of the image corresponding to the sensor addressed. In other words, the depth controller machine 120 may be configured to determine a depth value for each sensor 106 of the sensor array 104. In some implementations, a series of IR image acquisitions (e.g., 6-9) in rapid succession may be used to obtain the phase offset. In combination depth- and flat-imaging applications, both of the above addressing modes may be used in a multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions ($X_i$, $Y_i$) of an imaged scene, with a depth value ($Z_i$) indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the IR illumination source may project pulsed or otherwise modulated IR illumination towards the subject. The sensor array of the depth-imaging camera may be configured to detect the phase offset between the illumination reflected back from the subject and the modulated emission. In some implementations, the phase offset of each sensor may be converted into a pixel-resolved time of flight of the pulsed illumination, from the illumination source to the subject and then back to the array. ToF data may then be converted into depth data.

The term 'spectral light image' refers to a matrix of pixels registered to corresponding regions ($X_i$, $Y_i$) of an imaged scene, with a spectral value ($SV_i$) indicating, for each pixel, the spectral signature of the corresponding region in the particular spectral light sub-band. For acquiring the spectral light images in each of the sub-bands (e.g., for a multi-spectral image), the spectral controller machine 122 is configured to determine a spectral value for each of the differential sensors based on the depth value and a differential measurement of active spectral light and ambient light for the differential sensor.

The depth and multispectral data acquired by the camera 100 may be used to fit a neighborhood of pixels to a regular surface (e.g., Lambertian plane), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (IR illuminator 114 or spectral illuminators 116) to the subject 102.

Output machine 124 is configured to output a matrix of pixels 132. Each pixel in the matrix includes the depth value ($Z_i$) and the spectral value (e.g., $SV1_i$, $SV2_i$, ... $SV6_i$) for each of the spectral light sub-bands of the plurality of spectral illuminators 116 of the camera 100. The output machine 124 may be configured to output the matrix of pixels 132 in any suitable form. In some examples, the output machine 124 may output the matrix of pixels 132 as a data structure in which each element of the matrix corresponds to a different pixel, and each element of the matrix includes an array of values corresponding to the depth value and the spectral values for that pixel. Note that a spectral value for the IR light sub-band may be determined for each differential sensor in the process of determining the depth value, and thus each pixel in the matrix may include a spectral value for the IR light sub-band. Further, note that the output machine 124 may be configured to output the matrix of pixels 132 (and/or any other suitable parameter value) to any suitable recipient internal or external to the camera 100. For example, the output machine 124 may be configured to output the matrix of pixels 132 to another processing component for additional image processing (e.g., filtering, computer vision). In some examples, the processing component may be incorporated into the camera 100. In some examples, the processing component may be incorporated into a remote computing device in communication with the camera 100. In another example, the output machine 124 may be configured to output the matrix of pixels 132 to an external display device for visual presentation as an image.

Figure 2A:
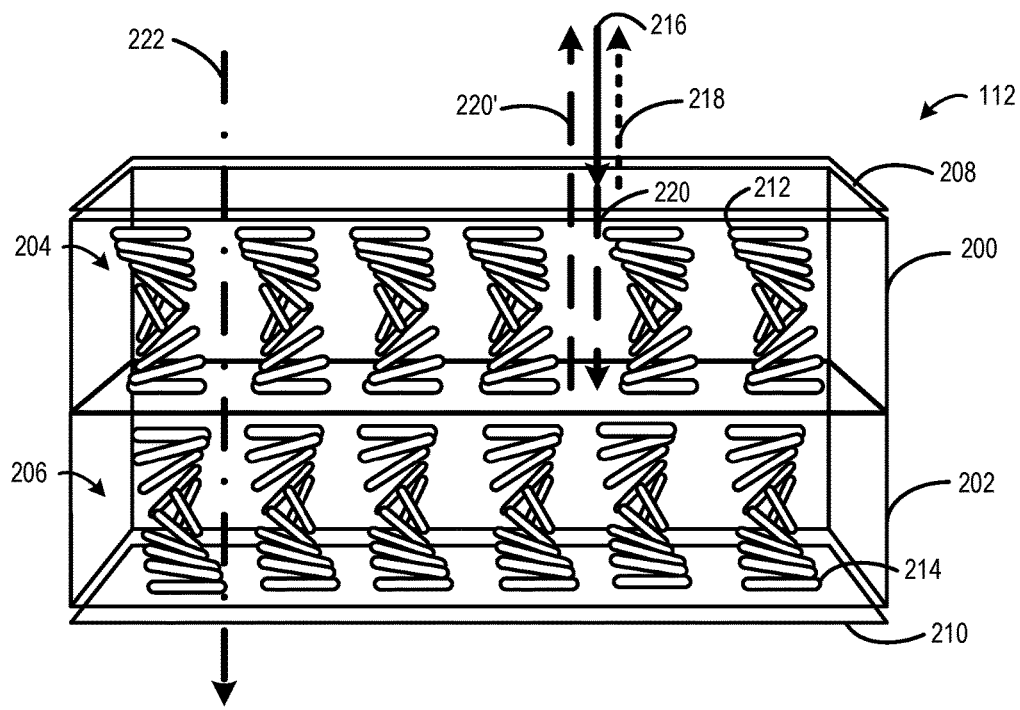
FIGS. 2A and 2B schematically show aspects of a tunable optical filter switched between a reflection state and a transmission state.
Figure 2B:
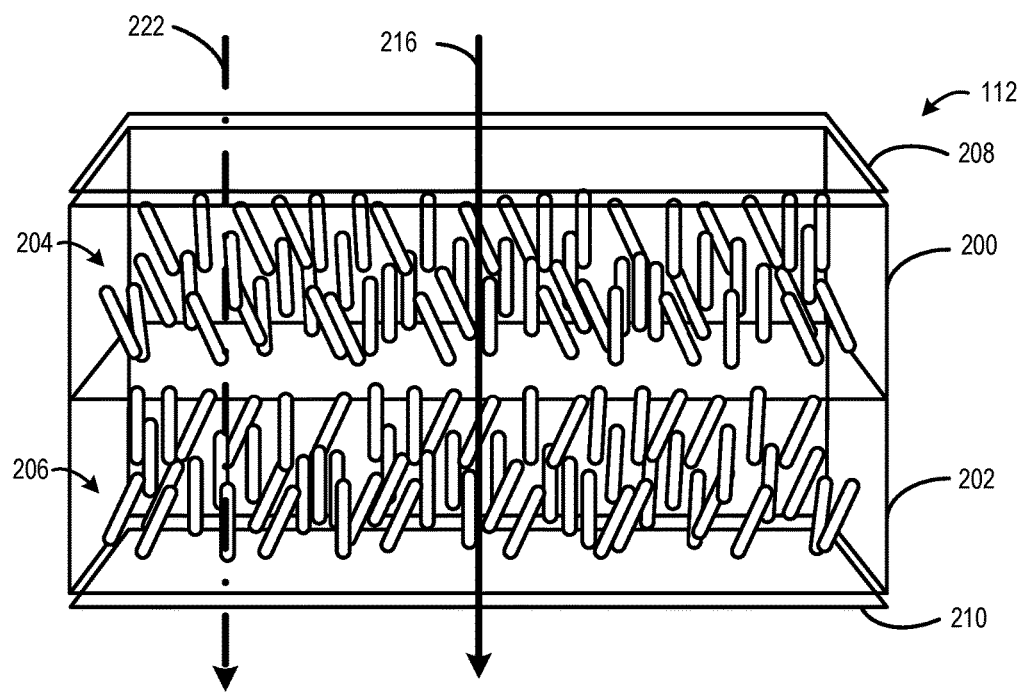

FIGS. 2A and 2B schematically show aspects of a matched pair of liquid crystal layers of the optical filter 112 of FIGS. 1A-1C. Optical filter 112 includes example liquid crystal (LC) layers 200 and 202. LC layers 200 and 202 may be representative of one of a plurality of matched pairs of LC layers of the optical filter. LC layers 200, 202 may be individually switchable between a reflection state and a transmission state by applying a voltage across the LC layers 200, 202 via electrodes 208, 210. LC layers 200, 202 may be configured to block spectral light in the same spectral light sub-band and transmit spectral light outside of the spectral light sub-band in the reflection state, and to transmit spectral light in the spectral light sub-band along with spectral light outside the spectral light sub-band in the transmission state.

The LC layer 200 includes a plurality of liquid crystals 204 and the LC layer 202 includes a plurality of liquid crystals 206. The pluralities of liquid crystals 204, 206 are configured to form cholesteric phase structures that block light in a spectral light sub-band and transmit light outside of the spectral light sub-band in the reflection state. Furthermore, the pluralities of liquid crystals 204, 206 are each configured to form a nematic phase arrangement that transmits light in the spectral light sub-band along with light outside the spectral light sub-band in the transmission state.

The liquid crystals 204 may be differently configured than the liquid crystals 206 such that each of the differently-configured plurality of liquid crystals selectively reflect differently-polarized light. In particular, the liquid crystals 204 may be configured to reflect right-handed circularly polarized light in the reflection state and the liquid crystals 206 may be configured to reflect left-handed circularly polarized light in the reflection state. The differently configured liquid crystals 204, 206 may cooperate to make the optical filter 112 polarization-insensitive.

In FIG. 2A, an activation voltage is not applied to electrodes 208, 210 such that the LC layers 200, 202 are in the reflection state. In the reflection state, the liquid crystals 200 and 202 are in a cholesteric liquid crystal (CLC) phase. In the CLC phase, the liquid crystals 200, 202 rotate about an axis parallel to an optical axis of the camera to form helical structures. In the illustrated example, the liquid crystals 204 in the LC layer 200 form helical structures 212 having right-handed rotation about the rotational axis. In other words, the helical structures 212 are twisted counter-clockwise. Further, the liquid crystals 206 in the LC layer 202 form helical structures 214 having left-handed rotation about the rotational axis. In other words, the helical structures 214 are twisted clockwise.

When unpolarized spectral light 216 in a spectral light sub-band that is blockable by the LC layers 200, 202 is incident on the LC layer 200, right-handed circularly polarized (RHCP) light 218 that matches the handedness of the helical structures 212 in the LC layer 200 is reflected back by the helical structures 212. The remaining left hand circular polarized (LHCP) light 220 is transmitted through the LC layer 200 with minimal change (e.g., except small losses due to absorption in the conductors, reflections from interfaces or scattering in the liquid crystals). When the LHCP light 220 is incident on the LC layer 202, the left-handed helical structures 214 reflect the LHCP light 220'. This reflected LHCP light 220' is transmitted back through the LC layer 200 in the return path. Accordingly, all the unpolarized spectral light 216 (within a bandwidth ($\Delta\lambda$) of the CLC) is substantially reflected by the LC layers 200, 202 of the optical filter 112.

In some implementations, both LC layers 200, 202 may be configured to reflect LHCP light in the reflection state, and the optical filter may further include a ½ wave plate positioned between LC layers 200, 202. The ½ wave plate may be configured to change RHCP light that is transmitted through LC layer 200 into LHCP light that is then reflected by LC layer 202. In some implementations, both LC layers 200, 202 may be configured to reflect RHCP light in the reflection state, and the optical filter may further include a ½ wave plate positioned between LC layers 200, 202. The ½ wave plate may be configured to change LHCP light that is transmitted through LC layer 200 into RHCP light that is then reflected by LC layer 202.

Furthermore, in the reflection state, IR light 222 is transmitted with high efficiency independent of its polarization through the LC layers 200, 202 of the optical filter 112. Accordingly, when the optical filter is in the reflection state, the optical filter 112 can be used for IR/depth imaging without interference from impinging spectral light outside of the IR light sub-band (e.g. visible light). In other implementations, the LC layers may be configured to block IR light when the LC layers are in the reflection state.

In one example, the LC director may follow a trajectory to form the helical structures as described by nx=cos(qz), ny=sin(qz), nz=0, where q is the rate of molecular rotation (q=$2\pi/P_0$), and $P_0$ is the distance over which the LC director completes a full cycle of rotation ($2\pi$). Such CLC helical structures 212, 214 provide a wavelength-selective reflection whose spectral characteristics depend on $P_0$, birefringence of the LC ($\Delta n$=ne−no), the wavelength, and the angle of incidence. The CLC phase provides a wavelength-selective Bragg reflection, which occurs at a center wavelength of $\lambda_0$=n$P_0$ cos θ, where $n^2$=(n$e^2$+2n$o^2$)/3, ne and no are the extraordinary and ordinary refractive indexes of the LC, respectively, and θ is the angle of propagation inside the LC. Furthermore, bandwidth of the Bragg reflection can be calculated by $\Delta\lambda$ $\Delta$n$P_0$.

In FIG. 2B, an activation voltage is applied to each of the transparent conductors 208, 210 that generates an electric field across the LC layers 200, 202 to switch the LC layers 200, 202 to the transmission state. In particular, the electric field causes the helical structures to unwind and convert the liquid crystals 204 and 206 from the cholesteric phase to a nematic phase. In the transmission state, all incident spectral light 216 is transmitted through the LC layers 200, 202 of the optical filter 112 to the sensor array with high efficiency. Also, all incident IR light 222 is transmitted through the LC layers 200, 202 of the optical filter. In other words, the LC layers 200, 202 effectively become glass slabs when the LC layers 200, 202 are placed in the transmission state. For example, all of the LC layers of the optical filter 112 may be switched to the transmission state when the camera is used for monochrome imaging. In other implementations, the LC layers may be configured to block IR light when the LC layers are in the transmission state.

It will be appreciated that the LC layers 200, 202 may be representative of any suitable matched pair of LC layers included in a plurality of LC layers of the optical filter 112. The optical filter 112 may include any suitable number of matched pairs of LC layers that are each polarization insensitive. Different matched pairs of LC layers may be configured to block spectral light in different spectral light sub-bands in the reflection state. Accordingly, different LC layers of the optical filter may be individually switched from the transmission state to the reflection state to tune the optical filter to block spectral light in all but a selected spectral light sub-band.

In one example, a LC layer may be designed such that the center wavelength corresponds to a first wavelength by using a pitch $P_1$ (e.g. $\lambda_1$=n$P_1$ cos θ) with preferably a narrow bandwidth ($\Delta\lambda_1$=$\Delta$n$P_1$). Narrow bandwidth can be achieved for example by using an LC with small birefringence ($\Delta$n). This layer would act as an optical filter for a narrowband spectrum of light centered at $\lambda_1$. Similarly, another LC layer may be designed such that the center wavelength corresponds to a second, different wavelength by using a pitch $P_2$ (e.g. $\lambda_2$=n$P_2$ cos θ) and so on. Multiple LC layers may be stacked together, and the selected spectral light sub-band that is transmitted though such a stack of LC layers can be varied among different wavelengths ($\lambda_1, \lambda_2, \ldots \lambda_N$) and/or different bandwidths.

FIGS. 3A-3F schematically show different ways in which the optical filter 112 may be tuned to reflect/transmit spectral light in different spectral light sub-bands. The optical filter 112 is shown in simplified form including six liquid crystal layers 300 (e.g., 300A, 300B, 300C, 300D, 300E, 300F) each configured to block spectral light in a different spectral light sub-band in the reflection state. Although not shown, the optical filter 112 may include additional LC layers configured to block different handed polarized light as described above such that the optical filter is polarization insensitive.

Figure 3A:
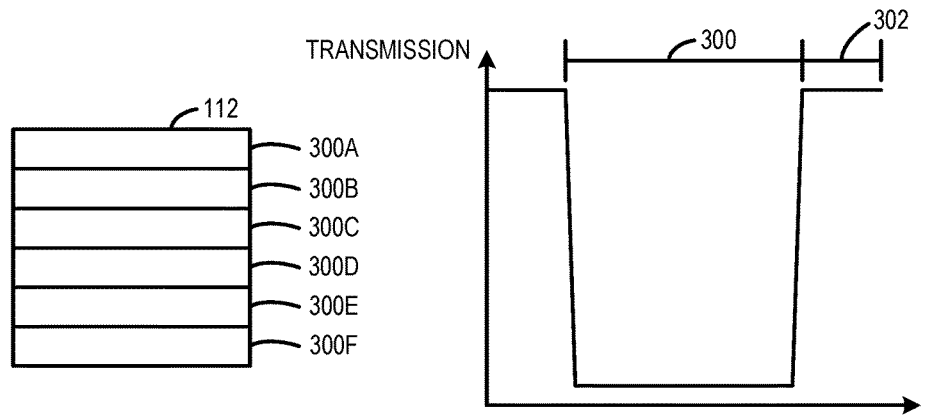
FIGS. 3A-3F schematically show different ways in which an optical filter may be tuned to reflect/transmit spectral light in different spectral light sub-bands.

In FIG. 3A, all of the LC layers 300 are switched to the reflection state such that the optical filter 112 is tuned to block spectral light in the spectral light sub-band 300. For example, the spectral light sub-band 300 may correspond to the visible light sub-band (e.g., ~390 to 700 nm). Additionally, the optical filter 112 is configured to transmit IR light in the IR light sub-band 302.

Figure 3B:
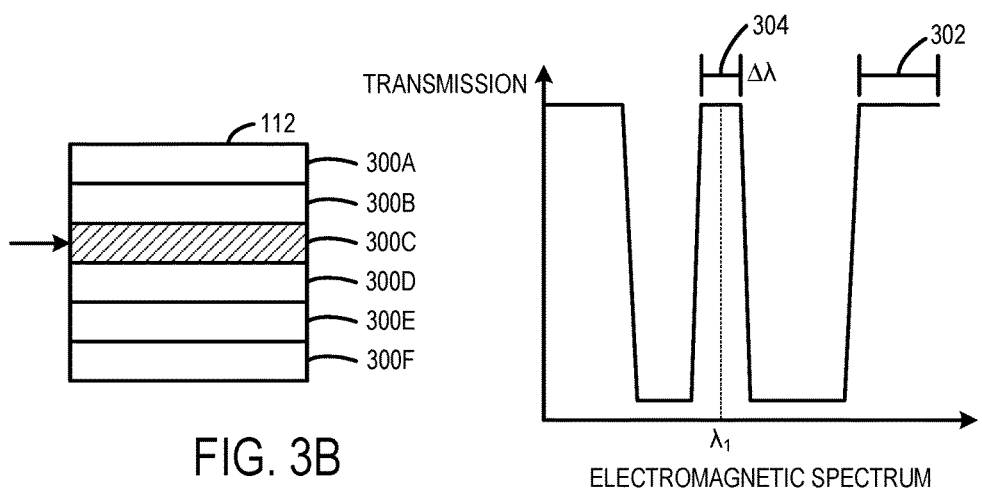

In FIG. 3B, a voltage is applied only to LC layer 300C to switch the LC layer from the reflection state to the transmission state. The other LC layers 300A, 300B, 300D, 300E, 300F are switched to the reflection state. In this way, the optical filter 112 is tuned to reflect spectral light in all but the spectral light sub-band 304 corresponding to the LC layer 300C. The spectral light sub-band 304 has a center wavelength ($\lambda$1) and a bandwidth ($\Delta\lambda$). IR light in IR light sub-band 302 is still transmitted.

Figure 3C:
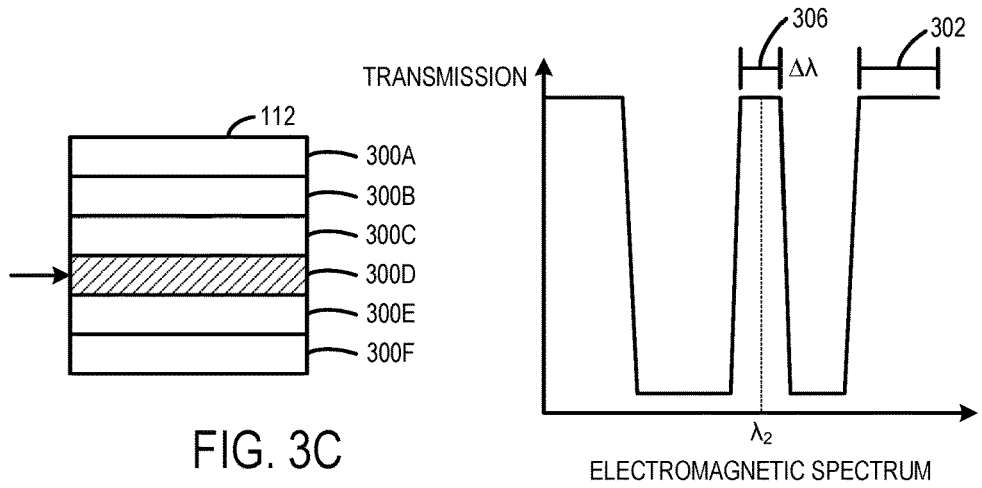

In FIG. 3C, a voltage is applied only to LC layer 300D to switch the LC layer from the reflection state to the transmission state. The other LC layers 300A, 300B, 300C, 300E, 300F are switched to the reflection state. In this way, the optical filter 112 is tuned to reflect spectral light in all but the spectral light sub-band 306 corresponding to the LC layer 300D. The spectral light sub-band 306 has a center wavelength ($\lambda$2) and a bandwidth ($\Delta\lambda$). In this example, the selected spectral light sub-band 306 is shifted higher up the electromagnetic spectrum relative to the spectral light sub-band 304 of FIG. 3B. For example, the spectral light sub-bands 304, 306 may correspond to spectral light sub-bands of different spectral light illuminators used in an active illumination multispectral camera. IR light in IR light sub-band 302 is still transmitted.

Figure 3D:
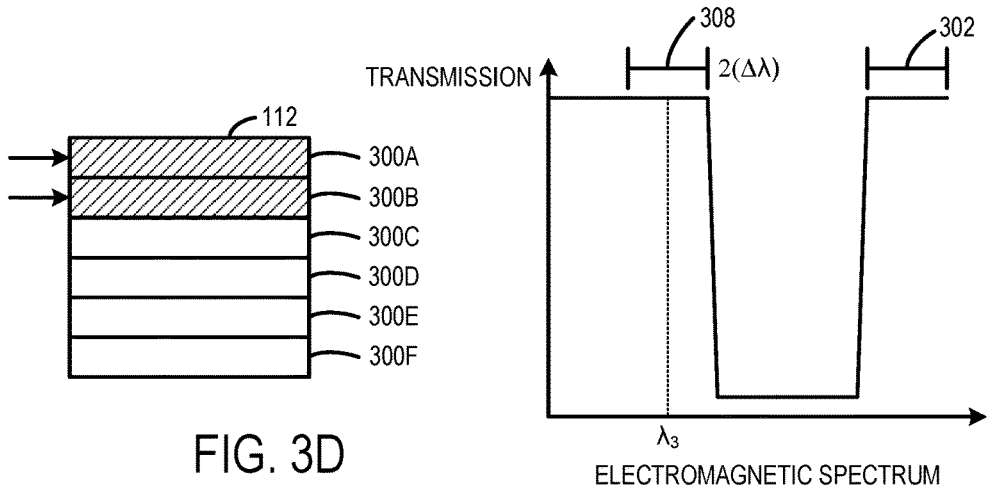

In FIG. 3D, a voltage is applied only to LC layers 300A, 300B to switch the LC layers from the reflection state to the transmission state. The other LC layers 300C, 300D, 300E, 300F are switched to the reflection state. In this way, the optical filter 112 is tuned to reflect spectral light in all but the spectral light sub-band 308 corresponding to the LC layers 300A, 300B. The spectral light sub-band 308 has a center wavelength ($\lambda$3) and a bandwidth (2($\Delta\lambda$)). In this example, the selected spectral light sub-band 306 is shifted lower down the electromagnetic spectrum and the bandwidth of the spectral light sub-band 308 is increased relative to the spectral light sub-band 306 of FIG. 3C. In this example, the optical filter 112 may be tuned to operate as a high pass-filter. IR light in IR light sub-band 302 is still transmitted.

Figure 3E:
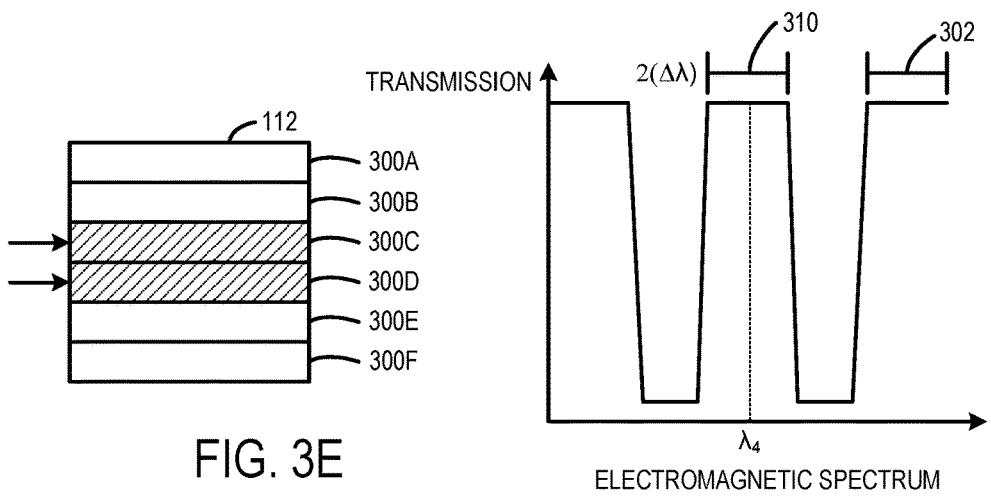

In FIG. 3E, a voltage is applied only to LC layers 300C, 300D to switch the LC layers from the reflection state to the transmission state. The other LC layers 300A, 300B, 300E, 300F are switched to the reflection state. In this way, the optical filter 112 is tuned to reflect spectral light in all but the spectral light sub-band 310 corresponding to the LC layers 300C, 300D. The spectral light sub-band 310 has a center wavelength ($\lambda$4) and a bandwidth (2($\Delta\lambda$)). In this example, the selected spectral light sub-band 310 is shifted higher up the electromagnetic spectrum relative to the spectral light sub-band 308 of FIG. 3D. IR light in IR light sub-band 302 is still transmitted.

Figure 3F:
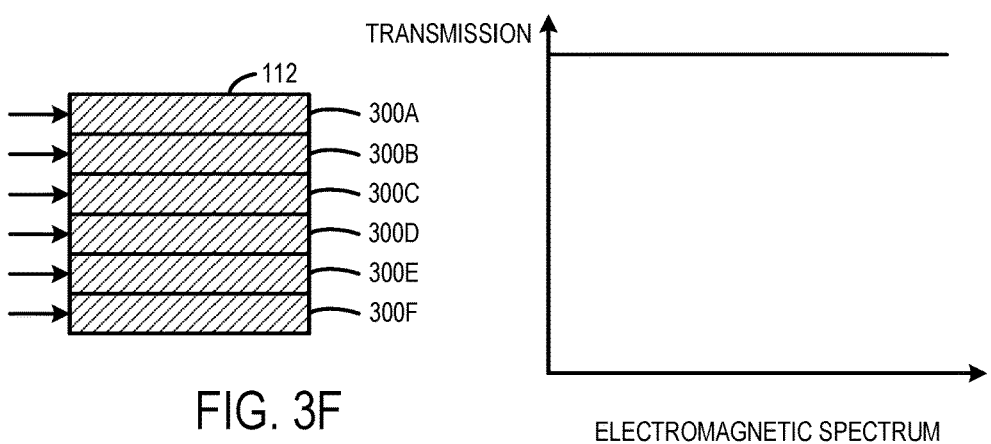

In FIG. 3F, a voltage is applied to all of the LC layers 300 to switch the LC layers from the reflection state to the transmission state. In this way, the optical filter 112 is tuned to transmit all spectral light and IR light.

It will be appreciated that the optical filter 112 may be configured to be tuned to block spectral light in all but any suitable selected spectral light sub-band. Moreover, the optical filter 112 may be tuned to any suitable number of different spectral light sub-bands.

Figure 4:
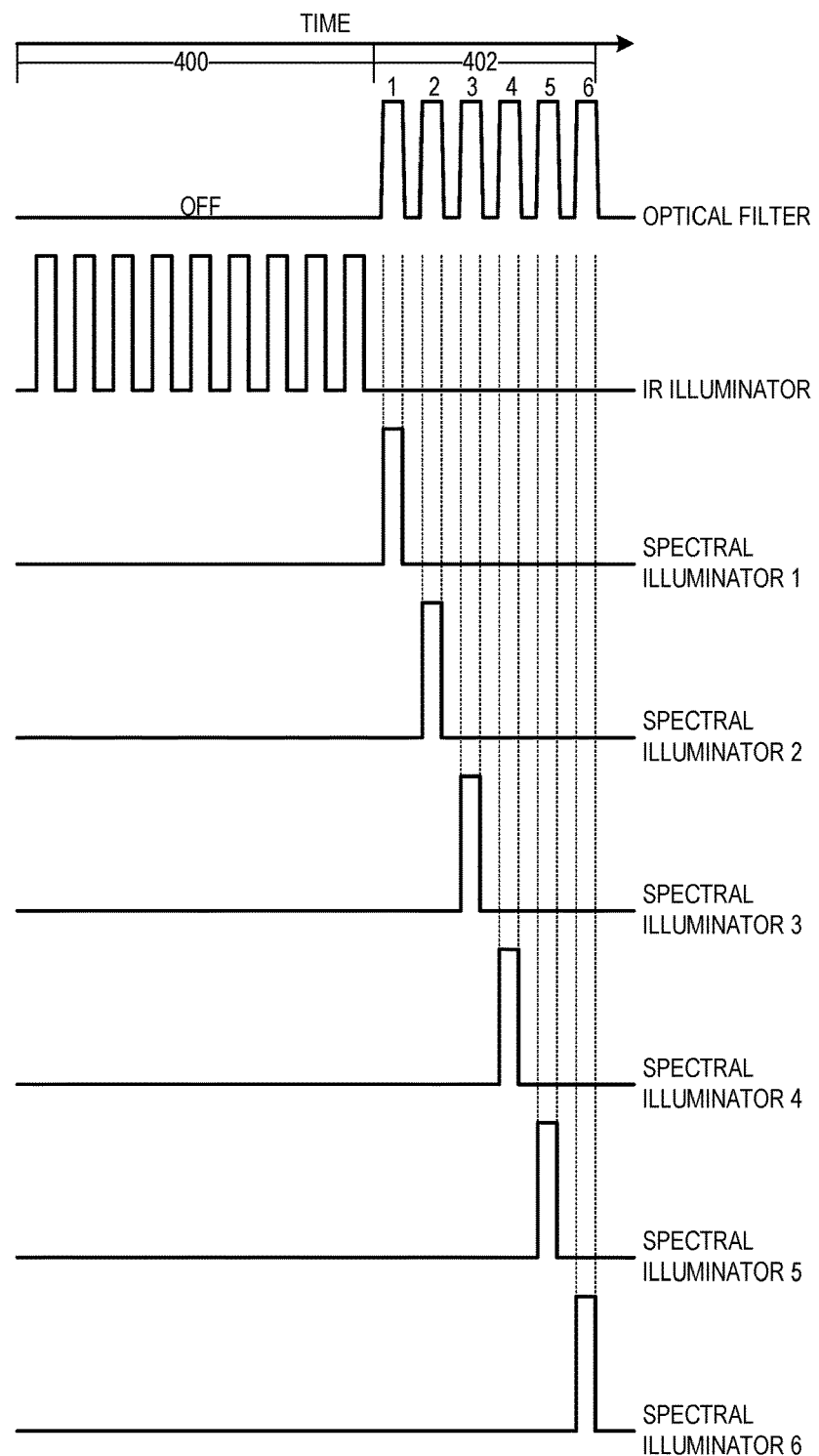
FIGS. 4-6 are timing graphs showing different example sequences of operation of an optical filter of a camera.
Figure 5:
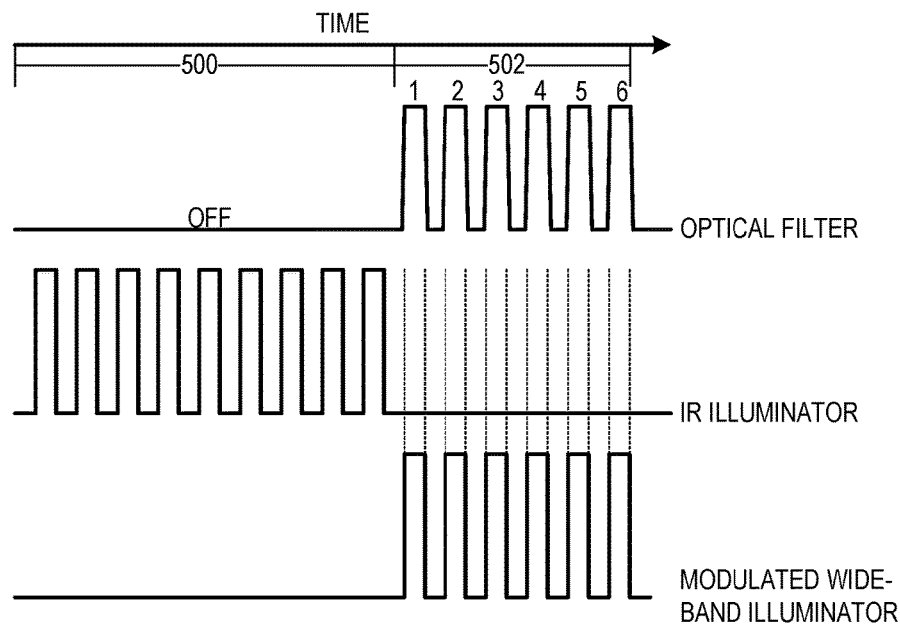
Figure 6:
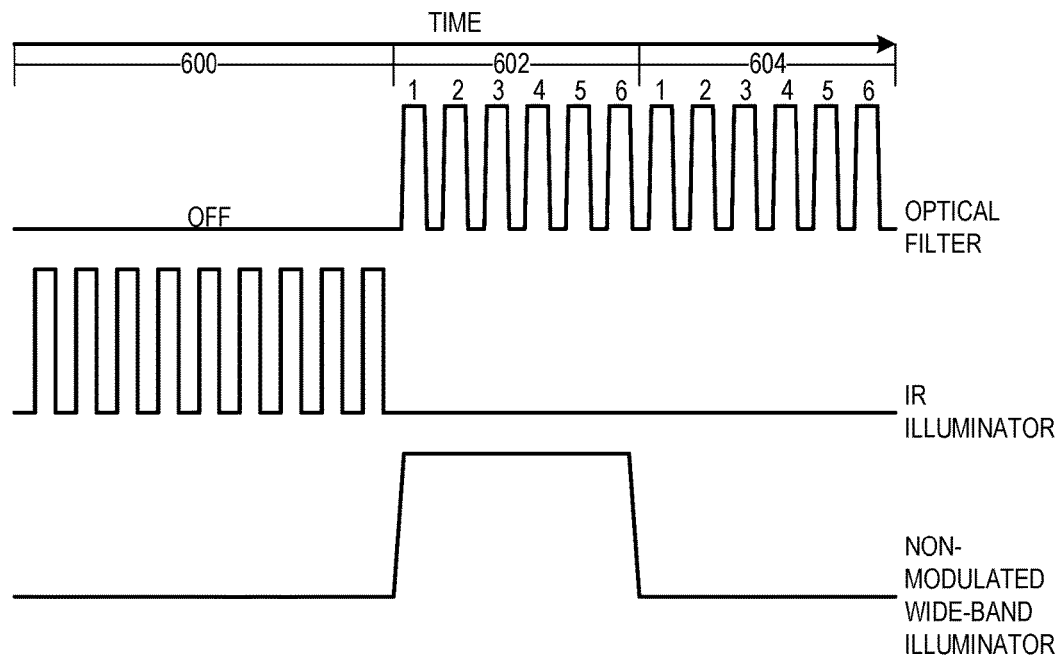

The tunable optical filter may be used in a camera for different types of image acquisition based on different types of illumination. FIGS. 4-6 are timing graphs showing different example sequences of operation of an optical filter of a camera with different illumination sources for different types of image acquisition. Note that the timing graphs depict only activation and deactivation times of the different illuminators. It will be appreciated that parameters of the light (e.g., frequency, amplitude) may be modulated within each activation/deactivation cycle for the different illuminators. For example, during each activation and/or across two or more successive activations, the IR illuminator may modulate the frequency of IR illumination.

FIG. 4 shows example operation of a camera including an IR illuminator and a plurality of spectral illuminators that act as illumination sources for IR image acquisition and multi-spectral image acquisition. During an IR image acquisition period 400, the optical filter is tuned to block substantially all spectral light outside of the IR light sub-band (e.g., block light in all visible light sub-bands). In particular, the optical filter switches all of the plurality of liquid crystal layers to the reflection state to block the spectra light. The IR illuminator is activated on a periodic basis for nine IR illuminator activations and the sensor array is addressed in synchronicity with the activations of the IR illuminator to acquire nine IR images. The nine IR images may be used to determine a depth of an imaged subject. In this example, the activations of the IR illuminator occur rapidly in succession while the plurality of spectral illuminators remain deactivated during the period 400.

Once the IR illuminator has completed the nine activations, the spectral illuminators are sequentially activated while the IR illuminator remains deactivated during a multi-spectral image acquisition period 402. The optical filter is synchronously tuned, for each of the plurality of spectral illuminators, to preferably block spectral light outside of the spectral light sub-band of the spectral illuminator and allow transmission of spectral light in the spectral light sub-band of the spectral illuminator. In particular, the optical filter may switch the particular liquid crystal layers that are in the reflection state and in the transmission state for each activation of each of the different spectral illuminators. The sensor array is addressed in synchronicity with activations of each of the plurality of spectral illuminators to acquire spectral images in each of the spectral light sub-bands corresponding to the plurality of spectral illuminators.

The IR image acquisition period 400 and the multi-spectral image acquisition period 402 may be alternately repeated to determine the depth and spectral values for the subject in the different spectral light sub-bands corresponding to the different spectral illuminators. It will be appreciated that the IR illuminator and the plurality of spectral illuminators may be activated, and the optical filter may be tuned according to any suitable timing strategy.

FIG. 5 shows example operation of a camera including an IR illuminator and a modulated wide-band spectral illuminator (e.g., white light) that act as illumination sources for IR image acquisition and multi-spectral image acquisition. During an IR image acquisition period 500, the optical filter is tuned to block spectral light outside of the IR light sub-band (e.g., all visible light). The IR illuminator is activated on a periodic basis for nine IR illuminator activations and the sensor array is addressed in synchronicity with the activations of the IR illuminator to acquire nine IR images. The nine IR images are used to determine the depth of an imaged subject. In this example, the activations of the IR illuminator occur rapidly in succession while the wide-band spectral illuminator remain deactivated during the period 500.

Once the IR illuminator has completed the nine activations, the wide-band spectral illuminator is repeatedly activated while the IR illuminator remains deactivated during a multi-spectral image acquisition period 502. The optical filter is tuned to sequentially switch between a plurality of spectral light sub-bands (e.g., six spectral light sub-bands) in synchronicity with activation of the wide-band spectral illuminator. In particular, for each activation of the wide-band spectral illuminator, the optical filter switches the particular liquid crystal layers that are in the reflection state and in the transmission state to tune the optical filter for each of the plurality of spectral light sub-bands. The sensor array is addressed in synchronicity with activations of the wide-band spectral illuminator to acquire spectral images in each of the plurality of spectral light sub-bands. The IR image acquisition period 500 and the multi-spectral image acquisition period 502 may be alternately repeated to determine the depth and spectral values for the subject in the plurality of different spectral light sub-bands. It will be appreciated that the IR illuminator and the wide-band spectral illuminator may be activated, and the optical filter may be tuned according to any suitable timing strategy.

FIG. 6 shows example operation of a camera including an IR illuminator and a non-modulated wide-band spectral illuminator (e.g., white light) that act as illumination sources for IR image acquisition and multi-spectral image acquisition. During an IR image acquisition period 600, the optical filter is tuned to block spectral light outside of the IR light sub-band (e.g., all visible light). The IR illuminator is activated for nine IR illuminator activations and the sensor array is addressed in synchronicity with the activations of the IR illuminator to acquire nine IR images. The nine IR images may be used to determine the depth of an imaged subject. In this example, the activations of the IR illuminator occur rapidly in succession while the wide-band spectral illuminator remains deactivated during the period 600.

Once the IR illuminator has completed the nine activations, the wide-band spectral illuminator is activated while the IR illuminator remains deactivated during active illumination period 602. The optical filter is tuned to sequentially switch between a plurality of spectral light sub-bands (e.g., six spectral light sub-bands). In particular, the optical filter switches the particular liquid crystal layers that are in the reflection state and in the transmission state to tune the optical filter for each of the plurality of spectral light sub-bands. The sensor array is addressed in synchronicity with the tuning of the optical filter to measure active spectral light in the spectral light sub-band emitted from the non-modulated wide-band spectral illuminator and reflected from the subject back to each of the sensors. Note that in implementations in which the sensor array includes differential pixels, the differential pixels may be addressed with a suitable timing to measure the active spectral light in the spectral light sub-band emitted from the non-modulated wide-band spectral illuminator.

Once the active illumination measurements have been completed in the active illumination period 604, the wide-band spectral illuminator is deactivated during an ambient illumination period 604. The optical filter is tuned to sequentially switch between the plurality of spectral light sub-bands and the sensor array is addressed in synchronicity with the tuning of the optical filter to measure ambient light in the plurality of different spectral light sub-band. The ambient light measurements collected during period 604 may be subtracted from the active illumination measurements collected during 602 to determine a spectral signature of an image subject. The IR image acquisition period 600, the active illumination period 602, and the ambient illumination period 604 may be repeated to determine the depth and spectral values for the subject in the plurality of different spectral light sub-bands. It will be appreciated that the IR illuminator and the wide-band spectral illuminator may be activated, and the optical filter may be tuned according to any suitable timing strategy.

In some implementations, the optical filter may be employed in a camera to produce a spectral signature of an imaged subject without active illumination from an active illumination source. In particular, the spectral controller machine may be configured to tune the optical filter for each of a plurality of different spectral light sub-bands, and synchronously address the sensor array to measure ambient spectral light reflected from a subject back to each sensor of the sensor array in each of the plurality of different spectral light sub-bands. Note that in implementations in which the sensor array includes differential pixels, the differential pixels may be addressed with a suitable timing to measure the ambient light. The spectral controller machine may be configured to identify an ambient illuminant based on the sensor measurements corresponding to the plurality of different spectral light sub-bands. For example, white/gray patches in each image may be used as fiducials to recognize an ambient illuminant. The spectral controller machine may be configured to adjust the measurements in each of the plurality of different spectral light sub-bands based on the spectral characteristics of the identified ambient illuminant in order to provide an accurate estimation of a spectral signature of the imaged subject.

In some implementations, the optical filter may be used in a multi- or hyper-spectral camera to reduce the dimensionality of an acquired image. For example, a camera may be configured to acquire sensor measurements for a set of different spectral light sub-bands (e.g., >20 sub bands). During measurements in spectral light sub-bands that are not of interest, the optical filter may be tuned to block light in the spectral light sub-bands not of interest and spectral light outside of the sub-bands so that minimal spectral light reaches the sensor array. On the other hand, during measurements in spectral light sub-bands that are of interest, the optical filter may be tuned to transmit spectral light in the spectral light sub-bands of interest and block spectral light outside the spectral light sub-band of interest. In this way, a hyperspectral image may be down-sampled to only include spectral values for spectral light in spectral light sub-bands of interest.

Figure 7:
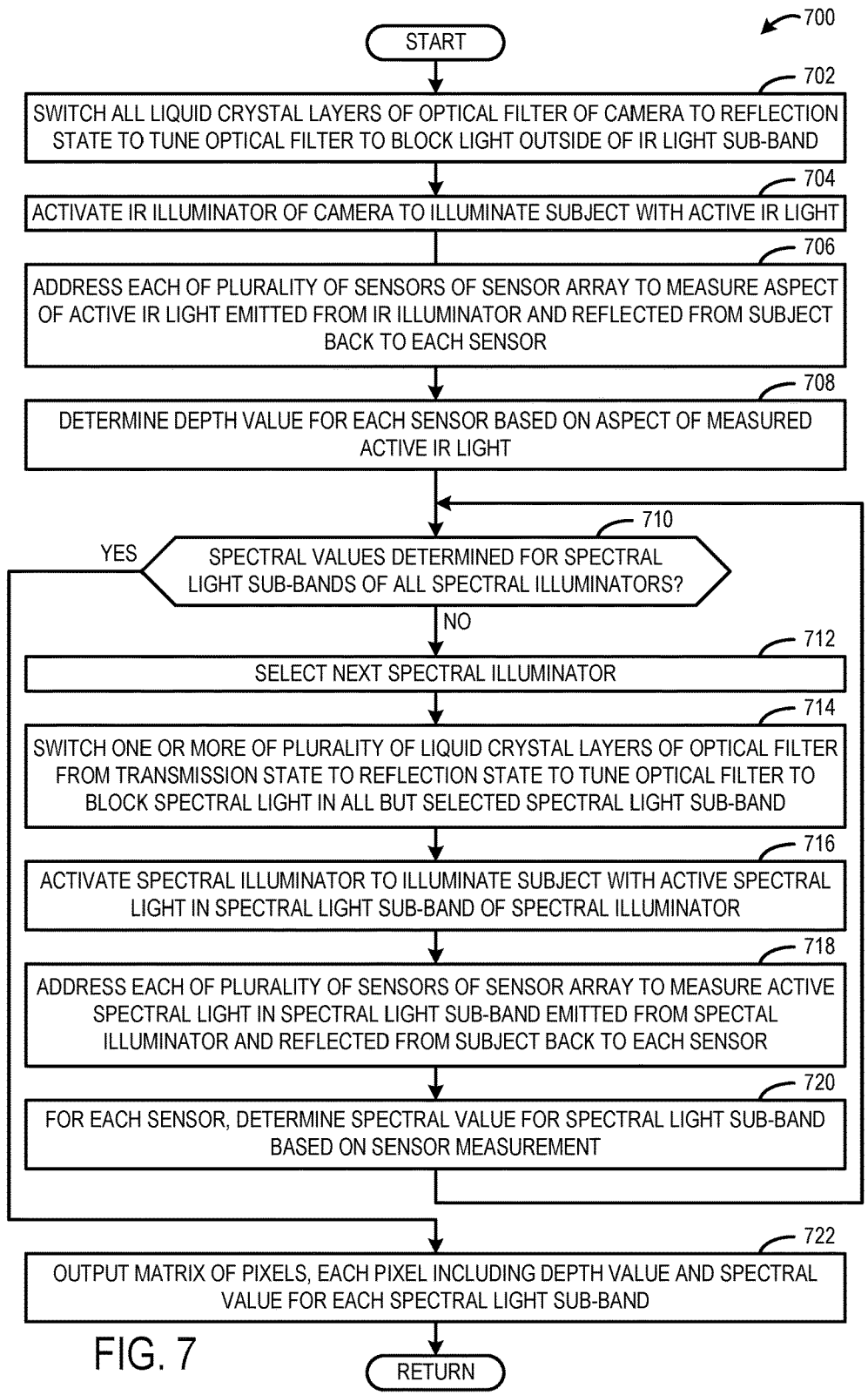
FIG. 7 shows an example image acquisition method.

FIG. 7 shows an example image acquisition method 700 using a tunable optical filter as described herein. For example, method 700 may be enacted by electronic controller 118 of camera 100.

At 702 of method 700, a plurality of individually switchable liquid crystal layers of an optical filter of a camera is switched to a reflection state. Each liquid crystal layer of the plurality of liquid crystal layers is configured to block spectral light in a different spectral light sub-band and transmit spectral light outside of the spectral light sub-band in the reflection state, and to transmit spectral light in the spectral light sub-band along with spectral light outside the spectral light sub-band in the transmission state. For example, when all of the plurality of liquid crystal layers of the optical filter are switched to the reflection state, the optical filter may be tuned to block visible light and transit IR light. At 704 of method 700, an IR illuminator of the camera is activated to illuminate a subject with active IR light. At 706 of method 700, each of a plurality of sensors of a sensor array of the camera is addressed to measure an aspect of the active IR light emitted from the IR illuminator and reflected from the subject back to each of the sensors. For example, a measured aspect may include intensity, phase offset, or another suitable aspect. At 708 of method 700, a depth value is determined for each of the sensors based on the measured active IR light.

At 710 of method 700, it is determined whether spectral values have been determined for spectral light sub-bands of all of a plurality of spectral illuminators of the camera. If spectral values have been determined for the spectral light sub-bands of the plurality of spectral illuminators, then method 700 moves to 722. Otherwise, method 700 moves to 712. At 712 of method 700, a next spectral illuminator is selected to be activated in order to acquire spectral data in the spectral light sub-band for the spectral illuminator. At 714, one or more liquid crystal layers of the plurality of liquid crystal layers of the optical filter is switched from the transmission state to the reflection state to tune the optical filter to block light in all but a selected spectral light sub-band corresponding to the spectral light sub-band of the selected spectral illuminator. At 716 of method 700, the spectral illuminator is activated to illuminate the subject with active spectral light in the sub-band of the spectral illuminator. At 718 of method 700, each of a plurality of sensors of the sensor array are addressed to measure spectral light in the selected spectral light sub-band.

In some implementations where the sensor array includes differential sensors, each differential sensor of the sensor array may be addressed to differentially measure 1) active spectral light emitted from the spectral illuminator and reflected from the subject back to each differential sensor, and 2) ambient light. In some implementations, the differential measurement may be performed within each differential sensor by activating a first region of each differential sensor to measure the active spectral light in the sub-band reflected from the subject back to the differential sensor plus the ambient light and activate a second region of each differential sensor to measure the ambient light. These two measurements may be performed during a single period of activation of the spectral illuminator. In this way, the differential measurement measures the active spectral light without being biased by the ambient light.

At 720 of method 700, for each sensor, a spectral value for the sub-band is determined based on the sensor measurements. In some implementations, the spectral value may be determined based on the depth value and the differential measurement for the sensor. Method 700 returns to 710 to determine if spectral values have been determined for all of the sub-bands of the plurality of spectral illuminators. If spectral values have been determined for all of the sub-bands, then method 700 moves to 718. At 718 of method 700, a matrix of pixels is outputted. Each pixel of the matrix includes a depth value and a spectral value for each spectral light sub-band of the plurality of spectral illuminators.

In some implementations, aspects of the method 700 may be performed using a camera with a single active spectral illumination source (e.g., modulated wide-band spectral illuminator or non-modulated wide-band spectral illuminator) or no active spectral illumination source (e.g., by relying on ambient light).

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
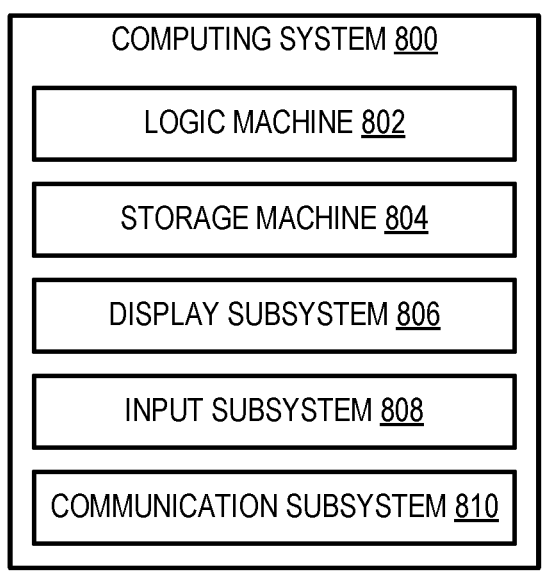
FIG. 8 shows an example computing system.

FIG. 8 schematically shows a non-limiting implementation of a computing system 800 that can enact one or more of the methods and processes described above. Computing system 800 is shown in simplified form. For example, computing system 800 may take the form of camera 100 or electronic controller 118 of FIG. 1.

Computing system 800 includes a logic machine 802 and a storage machine 804. Computing system 800 may optionally include a display subsystem 806, input subsystem 808, communication subsystem 810, and/or other components not shown in FIG. 800.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 804 may include semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of display images translating matrix of pixels 132 into a visual format perceivable by a human. As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some embodiments, the communication subsystem 810 may allow computing system 800 to send and/or receive messages to and/or from other devices via a network such as the Internet.

In an example, a camera comprises a sensor array including a plurality of sensors, an optical filter for the sensor array including a plurality of liquid crystal layers switchable between a reflection state and a transmission state, each liquid crystal layer configured to block spectral light in a different spectral light sub-band and transmit spectral light outside of the spectral light sub-band in the reflection state, and to transmit spectral light in the spectral light sub-band in the transmission state, a spectral controller machine configured to, switch one or more liquid crystal layers of the plurality of liquid crystal layers from the transmission state to the reflection state to tune the optical filter to block spectral light in all but a selected spectral light sub-band, and address the sensors of the sensor array to measure spectral light in the selected spectral light sub-band, and an output machine operatively connected to the sensor array and configured to output a matrix of pixels based on measurements of the sensor array, each pixel of the matrix including a spectral value for the selected spectral light sub-band. In this example and/or other examples, each liquid crystal layer of the plurality of liquid crystal layers may include a plurality of liquid crystals configured to form cholesteric phase structures that block light in a spectral light sub-band and transmit light outside of the spectral light sub-band in the reflection state, and form a nematic phase arrangement that transmits light in the spectral light sub-band in the transmission state. In this example and/or other examples, the optical filter may be configured to transmit infrared (IR) light in an IR light sub-band in both the transmission state and the reflection state. In this example and/or other examples, the optical filter may be configured to block substantially all visible light in all visible light sub-bands when all of the plurality of liquid crystal layers are in the reflection state. In this example and/or other examples, the spectral controller machine may be configured to adjust a center wavelength of the selected spectral light sub-band by switching one or more liquid crystal layers from the transmission state to the reflection state. In this example and/or other examples, the spectral controller machine may be configured to adjust a bandwidth of the selected spectral light sub-band by switching one or more liquid crystal layers from the transmission state to the reflection state. In this example and/or other examples, one or more of the plurality of liquid crystal layers may include a first liquid crystal layer configured to block right-handed circularly polarized light in a spectral light sub-band and transmit light outside of the spectral light sub-band in the reflection state, and a second liquid crystal layer configured to block left-handed circularly polarized light in the spectral light sub-band and transmit light outside of the spectral light sub-band. In this example and/or other examples, the spectral controller machine may be configured to tune the optical filter for each of a plurality of different spectral light sub-bands and identify an ambient illuminant based on sensor measurements corresponding to the plurality of different spectral light sub-bands. In this example and/or other examples, the spectral value for the selected spectral light sub-band may be adjusted based on the ambient illuminant. In this example and/or other examples, the camera may further comprise an IR illuminator configured to emit active IR light in an IR light sub-band, and a depth controller machine configured to, switch the plurality of liquid crystal layers of the optical filter to the reflection state, activate the IR illuminator to illuminate a subject with the active IR light, address each of the sensors of the sensor array to measure an aspect of the active IR light emitted from the IR illuminator and reflected from the subject back to each of the sensors, and determine, for each of the sensors, a depth value indicative of a depth of the subject based on the measured aspect of the active IR light, and each pixel of the matrix may include a depth value, and each spectral value may be calculated based on the depth value estimated for the sensor corresponding to the pixel. In this example and/or other examples, the camera may further comprise a spectral illuminator configured to emit active spectral light, the spectral controller machine may be configured to, for each of a plurality of spectral light sub-bands, tune the optical filter to block spectral light outside of the spectral light sub-band and allow transmission of spectral light in the spectral light sub-band, activate the spectral illuminator to illuminate a subject with active spectral light, and address each of the sensors of the sensor array to measure active spectral light in the spectral light sub-band emitted from the spectral illuminator and reflected from the subject back to each of the sensors, and each pixel of the matrix may include a plurality of spectral values, each spectral value may correspond to a spectral light sub-band of the plurality of spectral light sub-bands. In this example and/or other examples, the camera may further comprise a plurality of spectral illuminators, each spectral illuminator configured to emit active spectral light in a different spectral light sub-band, the spectral controller machine may be configured to, for each of the plurality of spectral illuminators, tune the optical filter to block spectral light outside of the spectral light sub-band of the spectral illuminator and allow transmission of spectral light in the spectral light sub-band of the spectral illuminator, activate the spectral illuminator to illuminate a subject with active spectral light in the spectral light sub-band of the spectral illuminator, and address each of the sensors of the sensor array to measure the active spectral light in the spectral light sub-band emitted from the spectral illuminator and reflected from the subject back to each of the sensors, and each pixel of the matrix may include a plurality of spectral values, each spectral value may correspond to a spectral light sub-band of one of the plurality of spectral illuminators. In this example and/or other examples, the camera may further comprise a spectral illuminator configured to emit non-modulated active spectral light, and the spectral controller machine may be configured to activate the spectral illuminator to illuminate a subject with non-modulated active spectral light, for each of a plurality of spectral light sub-bands, tune the optical filter to block spectral light that is outside of the spectral light sub-band and allow transmission of spectral light in the spectral light sub-band, and address each of the sensors of the sensor array to measure non-modulated active spectral light in the spectral light sub-band emitted from the spectral illuminator and reflected from the subject back to each of the sensors, de-activate the spectral illuminator, for each of a plurality of spectral light sub-bands, tune the optical filter to block spectral light that is outside of the spectral light sub-band and allow transmission of spectral light in the spectral light sub-band, and address each of the sensors of the sensor array to measure ambient light in the spectral light sub-band reflected from the subject back to each of the sensors, and each pixel of the matrix may include a plurality of spectral values, each spectral value may correspond to a different one of the plurality of spectral light sub-bands and each spectral value may be determined based on a differential measurement of the spectral light in the spectral light sub-band when the spectral illuminator is activated and when the spectral illuminator is de-activated.

In an example, an image acquisition method comprises switching one or more liquid crystal layers of a plurality of switchable liquid crystal layers of an optical filter of a camera from a transmission state to a reflection state to tune the optical filter to block light in all but a selected spectral light sub-band, each liquid crystal layer of the plurality of liquid crystal layers configured to block spectral light in a different spectral light sub-band and transmit spectral light outside of the spectral light sub-band in the reflection state, and to transmit spectral light in the spectral light sub-band in the transmission state, addressing each of a plurality of sensors of a sensor array of the camera to measure spectral light in the selected spectral light sub-band, and outputting a matrix of pixels based on measurements of the sensor array, each pixel of the matrix including a spectral value for the selected spectral light sub-band. In this example and/or other examples, the method may further comprise switching the plurality of liquid crystal layers of the optical filter to the reflection state, activating an IR illuminator of the camera to illuminate a subject with active IR light in an IR light sub-band, addressing each of a plurality of sensors of the sensor array to measure an aspect of the active IR light emitted from the IR illuminator and reflected from the subject back to each of the sensors, determining a depth value for each of the sensors based on the measured aspect of the active IR light, and each pixel of the matrix may include a depth value, and each spectral value may be calculated based on the depth value determined for the sensor corresponding to the pixel. In this example and/or other examples, the method may further comprise for each of a plurality of spectral illuminators of the camera, tuning the optical filter to block spectral light outside of the spectral light sub-band of the spectral illuminator and allow transmission of spectral light in the spectral light sub-band of the spectral illuminator, activating the spectral illuminator to illuminate the subject with active spectral light in the spectral light sub-band of the spectral illuminator, and addressing each of the sensors of the sensor array to measure the active spectral light in the spectral light sub-band emitted from the spectral illuminator and reflected from the subject back to each of the sensors, each pixel of the matrix may include a plurality of spectral values, and each spectral value may correspond to a spectral light sub-band of one of the plurality of spectral illuminators. In this example and/or other examples, each liquid crystal layer of the plurality of liquid crystal layers may include a plurality of liquid crystals configured to form cholesteric phase structures that block light in a spectral light sub-band and transmit light outside of the spectral light sub-band in the reflection state, and form a nematic phase arrangement that transmits light in the spectral light sub-band in the transmission state. In this example and/or other examples, the one or more liquid crystal layers of the optical filter may be switched to adjust one or more of a center wavelength of the selected spectral light sub-band and a bandwidth of the selected spectral light sub-band. In this example and/or other examples, one or more of the plurality of liquid crystal layers may include a first liquid crystal layer configured to block right-handed circularly polarized light in a spectral light sub-band and transmit spectral light outside of the spectral light sub-band in the reflection state, and a second liquid crystal layer configured to block left-handed circularly polarized light in the spectral light sub-band and transmit spectral light outside of the spectral light sub-band.

In an example, a camera comprises a sensor array including a plurality of sensors, an IR illuminator configured to emit active IR light in an IR light sub-band, a plurality of spectral illuminators, each spectral illuminator configured to emit active spectral light in a different spectral light sub-band, an optical filter for the sensor array including a plurality of liquid crystal layers individually switchable between a reflection state and a transmission state, each liquid crystal layer configured to block spectral light in a different spectral light sub-band and transmit spectral light outside of the spectral light sub-band in the reflection state, and to transmit spectral light in the spectral light sub-band along with spectral light outside the spectral light sub-band in the transmission state, a depth controller machine configured to switch the plurality of liquid crystal layers of the optical filter to the reflection state, activate the IR illuminator to illuminate a subject with the active IR light, address each of the sensors of the sensor array to measure an aspect of the active IR light emitted from the IR illuminator and reflected from the subject back to each of the sensors, and determine, for each of the sensors, a depth value indicative of a depth of the subject based on the measured aspect of the active IR light, and a spectral controller machine is configured to, for each of the plurality of spectral illuminators switch one or more of the plurality of liquid crystal layers of the optical filter from the transmission state to the reflection state to tune the optical filter to block spectral light outside of the spectral light sub-band of the spectral illuminator and allow transmission of spectral light in the spectral light sub-band of the spectral illuminator, activate the spectral illuminator to illuminate the subject with active spectral light in the spectral light sub-band of the spectral illuminator, and address each of the sensors of the sensor array to measure the active spectral light in the spectral light sub-band emitted from the spectral illuminator and reflected from the subject back to each of the sensors, and an output machine configured to output a matrix of pixels, each pixel corresponding to one of the plurality of sensors and including a depth value and a spectral value for each spectral light sub-band, each spectral value calculated based on the depth value estimated for the sensor corresponding to the pixel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
a sensor array including a plurality of sensors;
an optical filter for the sensor array including a plurality of liquid crystal layers switchable between a reflection state and a transmission state, each liquid crystal layer configured to block spectral light in a different spectral light sub-band and transmit spectral light outside of the spectral light sub-band in the reflection state, and to transmit spectral light in the spectral light sub-band in the transmission state;
a spectral controller machine configured to:
switch one or more liquid crystal layers of the plurality of liquid crystal layers from the transmission state to the reflection state to tune the optical filter to block spectral light in all but a selected spectral light sub-band, and
address the sensors of the sensor array to measure spectral light in the selected spectral light sub-band; and
an output machine operatively connected to the sensor array and configured to output a matrix of pixels based on measurements of the sensor array, each pixel of the matrix including a spectral value for the selected spectral light sub-band.

2. The camera of claim 1, wherein each liquid crystal layer of the plurality of liquid crystal layers includes a plurality of liquid crystals configured to form cholesteric phase structures that block light in a spectral light sub-band and transmit light outside of the spectral light sub-band in the reflection state, and form a nematic phase arrangement that transmits light in the spectral light sub-band in the transmission state.

3. The camera of claim 1, wherein the optical filter is configured to transmit infrared (IR) light in an IR light sub-band in both the transmission state and the reflection state.

4. The camera of claim 1, wherein the optical filter is configured to block substantially all visible light in all visible light sub-bands when all of the plurality of liquid crystal layers are in the reflection state.

5. The camera of claim 1, wherein the spectral controller machine is configured to adjust a center wavelength of the selected spectral light sub-band by switching one or more liquid crystal layers from the transmission state to the reflection state.

6. The camera of claim 1, wherein the spectral controller machine is configured to adjust a bandwidth of the selected spectral light sub-band by switching one or more liquid crystal layers from the transmission state to the reflection state.

7. The camera of claim 1, wherein one or more of the plurality of liquid crystal layers includes a first liquid crystal layer configured to block right-handed circularly polarized light in a spectral light sub-band and transmit light outside of the spectral light sub-band in the reflection state, and a second liquid crystal layer configured to block left-handed circularly polarized light in the spectral light sub-band and transmit light outside of the spectral light sub-band.

8. The camera of claim 1, wherein the spectral controller machine is configured to tune the optical filter for each of a plurality of different spectral light sub-bands and identify an ambient illuminant based on sensor measurements corresponding to the plurality of different spectral light sub-bands.

9. The camera of claim 8, wherein the spectral value for the selected spectral light sub-band is adjusted based on the ambient illuminant.

10. The camera of claim 1, further comprising:
an IR illuminator configured to emit active IR light in an IR light sub-band; and
a depth controller machine configured to:
switch the plurality of liquid crystal layers of the optical filter to the reflection state,
activate the IR illuminator to illuminate a subject with the active IR light,
address each of the sensors of the sensor array to measure an aspect of the active IR light emitted from the IR illuminator and reflected from the subject back to each of the sensors, and
determine, for each of the sensors, a depth value indicative of a depth of the subject based on the measured aspect of the active IR light, and
wherein each pixel of the matrix includes a depth value, and wherein each spectral value is calculated based on the depth value estimated for the sensor corresponding to the pixel.

11. The camera of claim 1, further comprising:
a spectral illuminator configured to emit active spectral light;
wherein the spectral controller machine is configured to, for each of a plurality of spectral light sub-bands:
tune the optical filter to block spectral light outside of the spectral light sub-band and allow transmission of spectral light in the spectral light sub-band,
activate the spectral illuminator to illuminate a subject with active spectral light, and
address each of the sensors of the sensor array to measure active spectral light in the spectral light sub-band emitted from the spectral illuminator and reflected from the subject back to each of the sensors, and
wherein each pixel of the matrix includes a plurality of spectral values, each spectral value corresponding to a spectral light sub-band of the plurality of spectral light sub-bands.

12. The camera of claim 1, further comprising:
a plurality of spectral illuminators, each spectral illuminator configured to emit active spectral light in a different spectral light sub-band;
wherein the spectral controller machine is configured to, for each of the plurality of spectral illuminators:
tune the optical filter to block spectral light outside of the spectral light sub-band of the spectral illuminator and allow transmission of spectral light in the spectral light sub-band of the spectral illuminator,
activate the spectral illuminator to illuminate a subject with active spectral light in the spectral light sub-band of the spectral illuminator, and
address each of the sensors of the sensor array to measure the active spectral light in the spectral light sub-band emitted from the spectral illuminator and reflected from the subject back to each of the sensors, and
wherein each pixel of the matrix includes a plurality of spectral values, each spectral value corresponding to a spectral light sub-band of one of the plurality of spectral illuminators.

13. The camera of claim 1, further comprising:
a spectral illuminator configured to emit non-modulated active spectral light; and
wherein the spectral controller machine is configured to:
activate the spectral illuminator to illuminate a subject with non-modulated active spectral light,
for each of a plurality of spectral light sub-bands,
tune the optical filter to block spectral light that is outside of the spectral light sub-band and allow transmission of spectral light in the spectral light sub-band, and
address each of the sensors of the sensor array to measure non-modulated active spectral light in the spectral light sub-band emitted from the spectral illuminator and reflected from the subject back to each of the sensors,
de-activate the spectral illuminator,
for each of a plurality of spectral light sub-bands,
tune the optical filter to block spectral light that is outside of the spectral light sub-band and allow transmission of spectral light in the spectral light sub-band, and
address each of the sensors of the sensor array to measure ambient light in the spectral light sub-band reflected from the subject back to each of the sensors, and
wherein each pixel of the matrix includes a plurality of spectral values, each spectral value corresponding to a different one of the plurality of spectral light sub-bands and wherein each spectral value is determined based on a differential measurement of the spectral light in the spectral light sub-band when the spectral illuminator is activated and when the spectral illuminator is de-activated.

14. An image acquisition method, the method comprising:
switching one or more liquid crystal layers of a plurality of switchable liquid crystal layers of an optical filter of a camera from a transmission state to a reflection state to tune the optical filter to block light in all but a selected spectral light sub-band, each liquid crystal layer of the plurality of liquid crystal layers configured to block spectral light in a different spectral light sub-band and transmit spectral light outside of the spectral light sub-band in the reflection state, and to transmit spectral light in the spectral light sub-band in the transmission state;
addressing each of a plurality of sensors of a sensor array of the camera to measure spectral light in the selected spectral light sub-band; and
outputting a matrix of pixels based on measurements of the sensor array, each pixel of the matrix including a spectral value for the selected spectral light sub-band.

15. The method of claim 14, further comprising:
switching the plurality of liquid crystal layers of the optical filter to the reflection state;
activating an IR illuminator of the camera to illuminate a subject with active IR light in an IR light sub-band;
addressing each of a plurality of sensors of the sensor array to measure an aspect of the active IR light emitted from the IR illuminator and reflected from the subject back to each of the sensors;
determining a depth value for each of the sensors based on the measured aspect of the active IR light; and
wherein each pixel of the matrix includes a depth value, and wherein each spectral value is calculated based on the depth value determined for the sensor corresponding to the pixel.

16. The method of claim 14, further comprising:
for each of a plurality of spectral illuminators of the camera,
tuning the optical filter to block spectral light outside of the spectral light sub-band of the spectral illuminator and allow transmission of spectral light in the spectral light sub-band of the spectral illuminator;
activating the spectral illuminator to illuminate the subject with active spectral light in the spectral light sub-band of the spectral illuminator; and
addressing each of the sensors of the sensor array to measure the active spectral light in the spectral light sub-band emitted from the spectral illuminator and reflected from the subject back to each of the sensors;
wherein each pixel of the matrix includes a plurality of spectral values, each spectral value corresponding to a spectral light sub-band of one of the plurality of spectral illuminators.

17. The method of claim 14, wherein each liquid crystal layer of the plurality of liquid crystal layers includes a plurality of liquid crystals configured to form cholesteric phase structures that block light in a spectral light sub-band and transmit light outside of the spectral light sub-band in the reflection state, and form a nematic phase arrangement that transmits light in the spectral light sub-band in the transmission state.

18. The method of claim 14, wherein the one or more liquid crystal layers of the optical filter are switched to adjust one or more of a center wavelength of the selected spectral light sub-band and a bandwidth of the selected spectral light sub-band.

19. The method of claim 14, wherein one or more of the plurality of liquid crystal layers includes a first liquid crystal layer configured to block right-handed circularly polarized light in a spectral light sub-band and transmit spectral light outside of the spectral light sub-band in the reflection state, and a second liquid crystal layer configured to block left-handed circularly polarized light in the spectral light sub-band and transmit spectral light outside of the spectral light sub-band.

20. A camera comprising:
a sensor array including a plurality of sensors;
an IR illuminator configured to emit active IR light in an IR light sub-band;
a plurality of spectral illuminators, each spectral illuminator configured to emit active spectral light in a different spectral light sub-band;
an optical filter for the sensor array including a plurality of liquid crystal layers individually switchable between a reflection state and a transmission state, each liquid crystal layer configured to block spectral light in a different spectral light sub-band and transmit spectral light outside of the spectral light sub-band in the reflection state, and to transmit spectral light in the spectral light sub-band along with spectral light outside the spectral light sub-band in the transmission state;
a depth controller machine configured to:
switch the plurality of liquid crystal layers of the optical filter to the reflection state,
activate the IR illuminator to illuminate a subject with the active IR light,
address each of the sensors of the sensor array to measure an aspect of the active IR light emitted from the IR illuminator and reflected from the subject back to each of the sensors, and
determine, for each of the sensors, a depth value indicative of a depth of the subject based on the measured aspect of the active IR light, and
a spectral controller machine is configured to, for each of the plurality of spectral illuminators:
switch one or more of the plurality of liquid crystal layers of the optical filter from the transmission state to the reflection state to tune the optical filter to block spectral light outside of the spectral light sub-band of the spectral illuminator and allow transmission of spectral light in the spectral light sub-band of the spectral illuminator,
activate the spectral illuminator to illuminate the subject with active spectral light in the spectral light sub-band of the spectral illuminator, and
address each of the sensors of the sensor array to measure the active spectral light in the spectral light sub-band emitted from the spectral illuminator and reflected from the subject back to each of the sensors, and
an output machine configured to output a matrix of pixels, each pixel corresponding to one of the plurality of sensors and including a depth value and a spectral value for each spectral light sub-band, each spectral value calculated based on the depth value estimated for the sensor corresponding to the pixel.

* * * * *